April 5, 1960 M. KEISER 2,932,002
ACOUSTIC POSITION FINDER
Original Filed April 23, 1953 5 Sheets-Sheet 1

INVENTOR.
MORRIS KEISER
BY
*William D. Hall*
ATTORNEY

April 5, 1960

M. KEISER 2,932,002

ACOUSTIC POSITION FINDER

Original Filed April 23, 1953

*INVENTOR.*
MORRIS KEISER

BY
*William D. Hall.*
ATTORNEY

April 5, 1960  M. KEISER  2,932,002
ACOUSTIC POSITION FINDER
Original Filed April 23, 1953  5 Sheets-Sheet 3

INVENTOR.
MORRIS KEISER
BY
William D. Hall
ATTORNEY

INVENTOR.
MORRIS KEISER

April 5, 1960     M. KEISER     2,932,002
ACOUSTIC POSITION FINDER

Original Filed April 23, 1953     5 Sheets-Sheet 5

INVENTOR.
MORRIS KEISER

United States Patent Office 2,932,002
Patented Apr. 5, 1960

2,932,002

ACOUSTIC POSITION FINDER

Morris Keiser, Cocoa Beach, Fla., assignor to the United States of America as represented by the Secretary of War Continuation of application Serial No. 350,784, April 23, 1953. This application July 22, 1957, Serial No. 673,546

9 Claims. (Cl. 340—16)

(Granted under Title 35, U.S. Code (1952), sec. 266)

This application is a continuation of application Serial No. 591,763, filed May 3, 1945 and its continuation application Serial No. 350,784, filed April 23, 1953, both now abandoned.

This invention may be manufactured and used by or for the Government for governmental purposes, without the payment of any royalty thereon.

This invention relates to an acoustic position-finder having a plurality of sound pickup stations, the stations being separated or displaced with respect to each other. Acoustic position-finders of this type may be used for locating the positions of such sources of sound as set off explosions, enemy guns, etc., each station giving the azimuth of the picked up sound wave, and the position of the source of sound being determined by obtaining the intersection of the azimuth lines.

According to one embodiment of the invention, the position-finder includes at least two sound-intercepting stations disposed in spaced relationship at each end of a base line, each station having a triangular array with a microphone placed at each apex of the triangle. The sound wave intercepted by the three microphones of the array is transformed into three corresponding voltage signals which are amplified, and the outputs of these amplifiers are impressed on three individual, magnetic recording heads positioned in recording relationship with respect to three magnetic tapes, the tapes acting as a recording medium for the intercepted sound waves; the number of magnetic tapes thus corresponds to the number of microphones used in each array for intercepting the sound wave. All tapes are mounted rigidly on the outer peripheries of cylindrical drums, which in turn are mounted on a common shaft, and are driven at a substantially constant speed by means of an appropriate governor-controlled or synchronous motor. All magnetic recording units are provided with erasing magnetic heads, with the result that the units record and erase continuously. When the sound that is to be recorded is heard by an operator, the recording and erasing circuits are disconnected by the operator, with the result that magnetic records of the sound wave are retained on all magnetic tapes, the position of the recorded signals on the individual magnetic tapes being determined by the time of arrival of the sound waves at the arrays, and also at the individual microphones of each array. The magnetic tapes or loops are of sufficient diameter to provide the "time reservoir" required for disconnecting the recording and erasing heads by the operators upon hearing the sound and prior to the erasing of the recorded sound wave by the erasing heads. Three individual reproducing heads are provided for playing back the signals recorded on each recording channel respectively. The "trapped" sound records are used for producing the visual images of the waves, the three images obtained from each array being used for measuring the degree of linear displacement of the two records with respect to the third record of the same array. This is accomplished by aligning the two reproducing heads with respect to their tapes until all three heads reproduce the sound wave in identical phase relationship on some suitable visual indicator of the signal, such as a cathode-ray oscilloscope. Suitable mechanical means, such as mechanical counters, are provided for measuring the displacements imparted to the two adjustable reproducing heads, and the azimuth of the intercepted sound wave is determined from the reading given by the counters.

According to another embodiment of the invention, the visual indicator is replaced with a headset, one receiver being connected to one magnetic reproducer, and the other receiver—to the other magnetic reproducer. The operator adjusts the position of one reproducer until the two sounds heard by him occur simultaneously.

According to an additional embodiment of the invention, the magnetic tapes are stationary during the reproducing cycle, and the reproducing heads are rotated with respect to the stationary magnetic tapes. The degree of signal displacements on the tapes is measured by shifting the tape rather than the reproducing heads. Six individual magnetic tapes are used in one system, and in the other, the total number of magnetic tapes has been reduced to two.

According to still another embodiment of the invention, the magnetc tapes are not used, and the sought results are obtained wholly by electronic means, each microphone array being connected to an oscilloscope which produces three traces of the intercepted sound wave; one trace for each microphone, and the azimuth of the sound wave is determined by measuring on the oscilloscope screen the displacements of the two traces with respect to the third trace.

Field tests have indicated that the triangle method of sound-ranging is superior to the other methods used in the past, the triangle method being adapted to satisfy the more rigorous demands of present field operations. These demands may be grouped as follows:

(a) Determination of maximum possible ranges with the lightest equipment, which at once calls for higher precision on the apparatus used for determining the azimuth of the sound wave;

(b) Greater speed in obtaining the results;

(c) Minimum noise-free time requirements for obtaining the results.

The first of these demands requires an improvement of the apparatus and general instrumental technique which includes the method of reading the record. The second and third demands require a more suitable microphone array for speeding up the field installation, and for speeding up and simplification of the entire operating technique. The apparatus disclosed in the specification satisfies all of the above mentioned demands more adequately than any of the prior known sound-ranging or position-finding systems.

Determination of maximum possible range with the lightest equipment attainable necessitates the reduction of the number of pickup devices, if such is possible, and the reduction of the size of the sound array. The invention discloses a sound array in which the number of the sound pickup devices has been reduced to three, the minimum required for defining a plane, these devices being preferably positioned in the horizontal plane, and at the apexes of an equilateral triangle, such triangle subtending the maximum area for the given total length of the sides of the triangle. Moreover, as will be demonstrated by the mathematical equations in this specification, such array simplifies the determination of azimuth of the intercepted sound wave, since the determination does not require an absolute calibration of the timing system in the central station equipment, or the knowledge of the length of the sides of the triangle, so long as all sides are equal. The positioning of the sound pickup devices in the horizontal plane is desirable to avoid the otherwise necessary corrections in the computations of the azimuth. The reduced size of the sound array is beneficial for several reasons: since the length of the electrical cables is obviously proportional to the size of the array, any reduction in its size at once reduces the bulk of the cable, and thus the size of the entire equipment. Moreover, it is much simpler to install and operate such array, which is an important factor, when such array must be operated in the vicinity of the front lines. From a strictly functional point of view, however, the reduction in size of the array is extremely beneficial for obtaining identical wave-forms at all points of the array.

There is an additional factor which must be considered when arrays of this type are operated in the vicinity of the front lines. The air over battle fronts is filled with sounds, and, if the microphone array is given large dimensions, a large number of individual sounds coming from different sources may be recorded by the system in the interim of time which is necessary for the desired sound wave to travel across the entire sound array. It is obvious that the smaller the sound array, the shorter is the period of time necessary for any individual sound wave to traverse the entire array, i.e., the shorter is the operating time of the array, and, as a consequence, the probability of interference between the desired and undesired sound waves is at a minimum.

The reduction in size of the microphone array, however, imposes more stringent requirements on the measurement of the operating time of the array, since this interval of time becomes increasingly shorter as the size of the array is reduced. Accordingly, if the system is to have the desired degree of accuracy in spite of the reduced size of the array, the apparatus for measuring this operating time must have sufficiently high accuracy to maintain the over-all accuracy constant.

The invention discloses an apparatus in which the sought time interval is not measured in absolute units of time, but is measured indirectly by comparing the time of arrival of the sound wave at the pickup device No. 1, with the time of arrival of the same sound wave at the pickup device No. 3, and the time of arrival of the same wave at the pickup device No. 2 with that of No. 3, and deriving the azimuth from the ratio of the measured quantities. Thus it is not necessary to have the absolute calibration of the timing system which greatly relaxes the functional requirements imposed on the system.

Because of the fact that the azimuth of the incoming sound wave is determined in the manner indicated above, only a short period of constant speed of the recording medium is required, i.e., the speed must remain constant only for the period of time which is required for the sound wave to traverse the microphone array. Since the microphone array has now been reduced to a relatively small size, this interval of time has been also reduced to a very short interval of time, and in actual practice it is in the order of at most fifty (50) milli-seconds. It is obvious that even when the speed does not remain strictly constant over a long period of time, it is a relatively simple matter to obtain a uniform speed for a period of fifty (50) milliseconds, since the inertia of the moving parts alone, aside from the speed regulation which is also used, will resist any appreciable speed changes in such short intervals of time. Thus the invention discloses a system which enables measurements of time intervals which are in the order of one ten thousandths of a second (.0001 sec.), with an extremely simple equipment which does not call for any absolute standards in any part of the equipment.

It is, therefore, an object of this invention to provide a method and apparatus for accurately determining the azimuth of a sound wave intercepted at a pickup station, which is provided with three-sound-intercepting devices, said devices being positioned at the apexes of an equilateral triangle lying in the horizontal plane, and instrumentalities connected to said array for comparing the time of arrival of the sound wave at the respective sound-intercepting devices, whereby determination of azimuth is performed independent of the absolute time or distance measurements, and without absolute speed control in the devices used for measuring the phase relationship, since the azimuth determination is a function only of the ratio of the time differences in the arrival of the sound wave at two points as compared to the third point.

An additional object of this invention is to provide a method and apparatus for accurately determining the azimuth of an intercepted sound wave at a pickup station provided with at least three sound-intercepting devices, positioned preferably in the horizontal plane, so that the intercepting devices form a planar sound array.

It is an additional object of this invention to provide a method and apparatus for accurately determining the azimuth of an intercepted sound wave at a pickup station provided with three sound-intercepting devices positioned in a single plane, so that said intercepting devices form a plane microphone array, the array forming an equilateral triangle of small area so that the noise-free time requirement of the array for obtaining results is in the order of .050 second.

Still another object of this invention is to provide a method and apparatus for accurately determining the azimuth of an intercepted sound wave by means of three sound-intercepting devices, forming an equilateral triangle and a planar sound array of the system, each of said sound-intercepting devices being connected to a magnetic tape for recording the intercepted sound on said tape, the phase relationship between the three records produced on the magnetic tape corresponding to the time of arrival of sound at the respective microphones, whereby the determination of the azimuth of the sound wave is reduced to the measurement of the linear displacement of the two records with respect to the third record.

It is an additional object of this invention to provide a method and apparatus for accurately determining the azimuth of an intercepted sound wave at a pickup station provided with three sound-intercepting devices, said devices forming a horizontal planar array of said station, and instrumentalities connected to said array for comparing the time of arrival of said sound wave on the respective microphones, the azimuth of the incoming sound wave being determined solely from the ratio of the time difference between the arrival of the sound wave at the two sound-intercepting devices as compared to the time of arrival of the same sound wave at the third sound-intercepting device.

It is an additional object of this invention to provide a method and apparatus for determining the position of a source of sound waves by deriving at each station the azimuth line of the intercepted sound wave, and determining the position of the source of sound by obtaining the point of intersection of the azimuth lines.

These and other features of the invention will be more clearly understood from the following detailed description and the accompanying drawings, in which.

Figure 1:
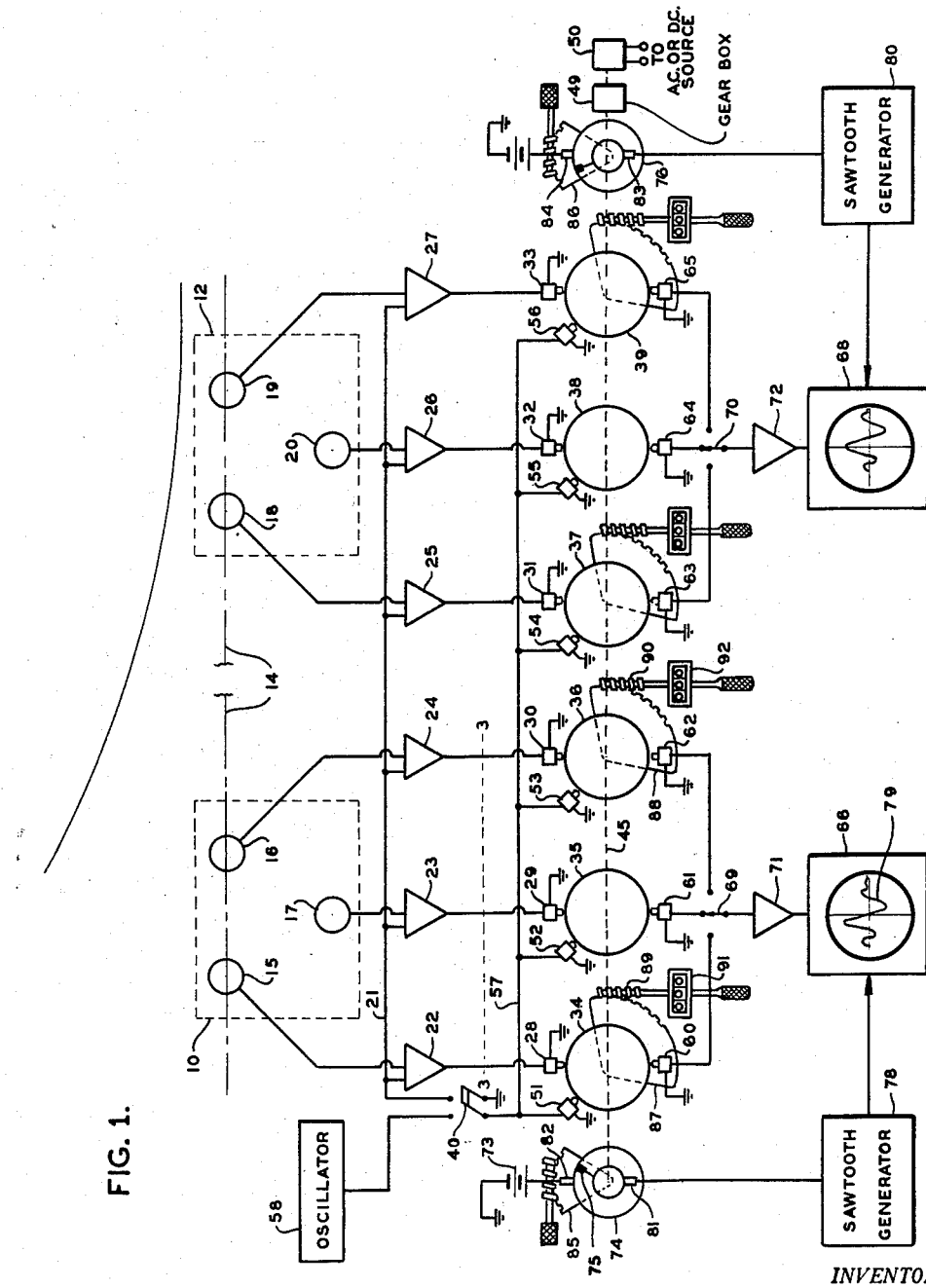
Figure 1 is a block diagram of one embodiment of the position-finder.
Figure 5:
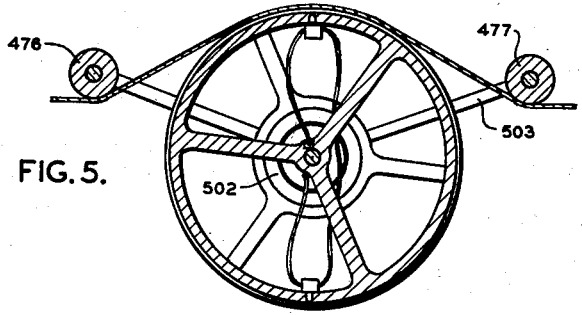
Figure 6:
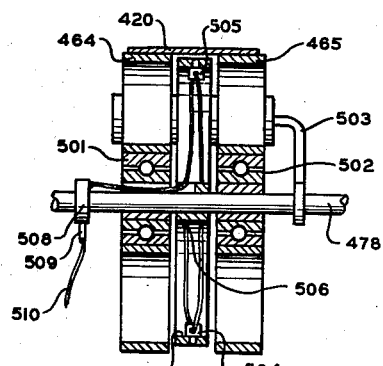
Figure 8:
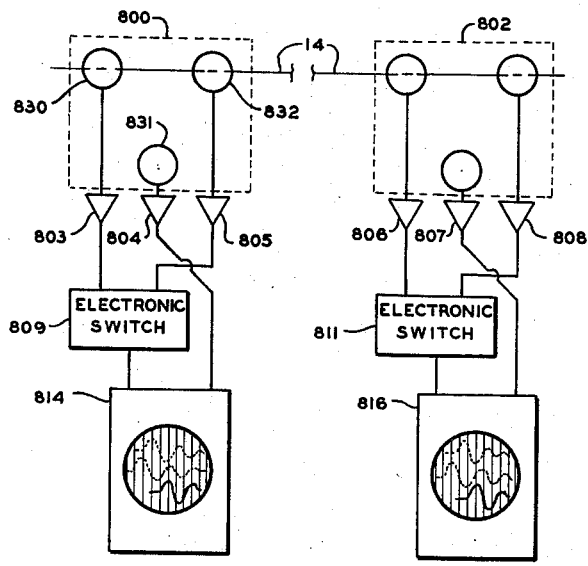
Figure 9:
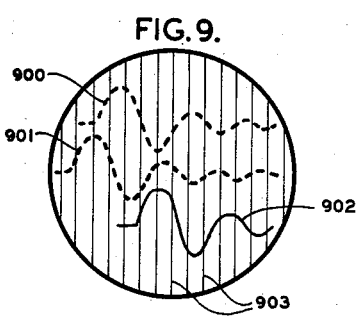
Figure 4:
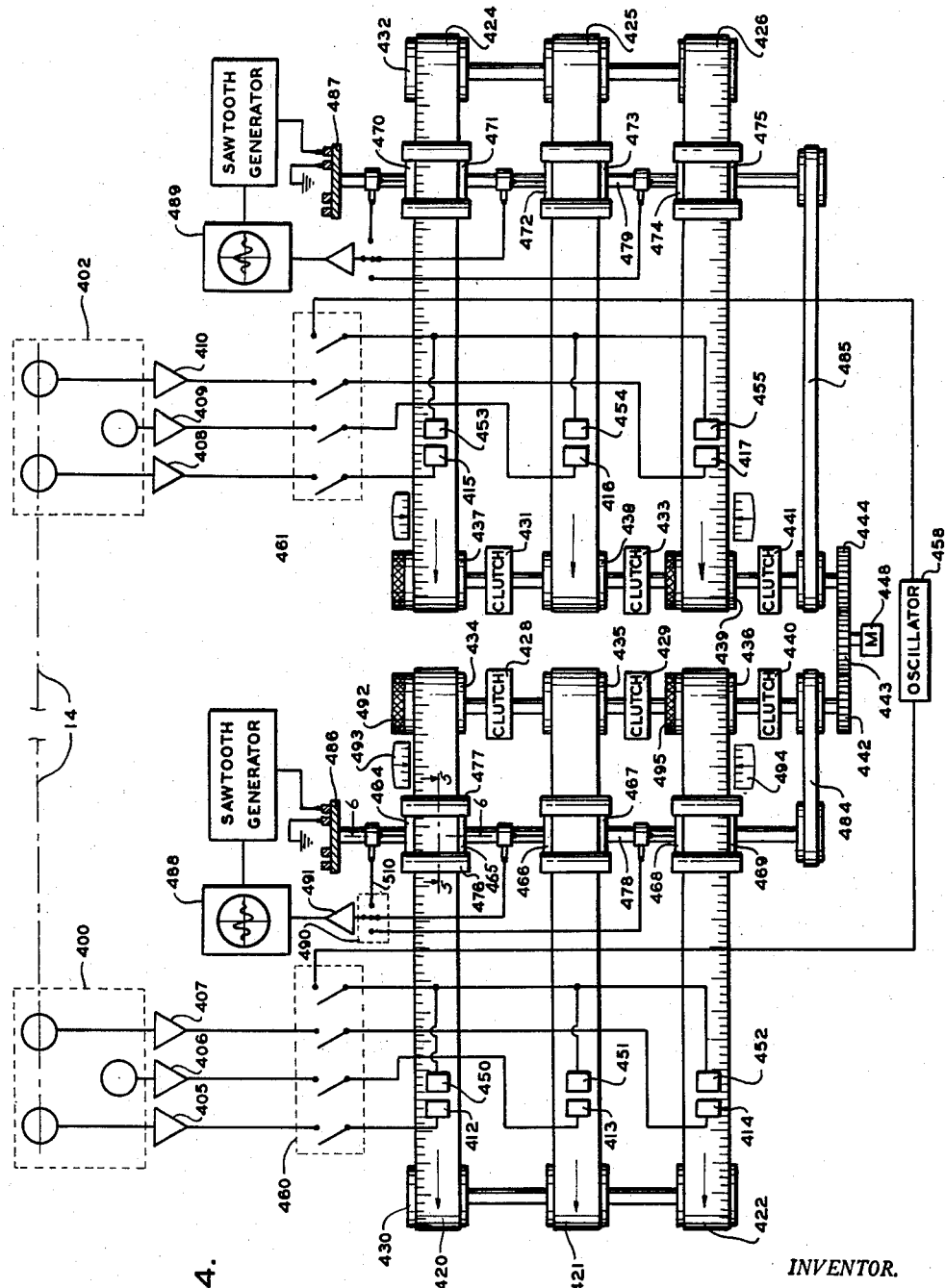
Figure 4 is a block diagram of a position-finder wherein the reproducing heads are rotated and the tapes are stationary during the reproducing cycle of the system.
Figure 7:
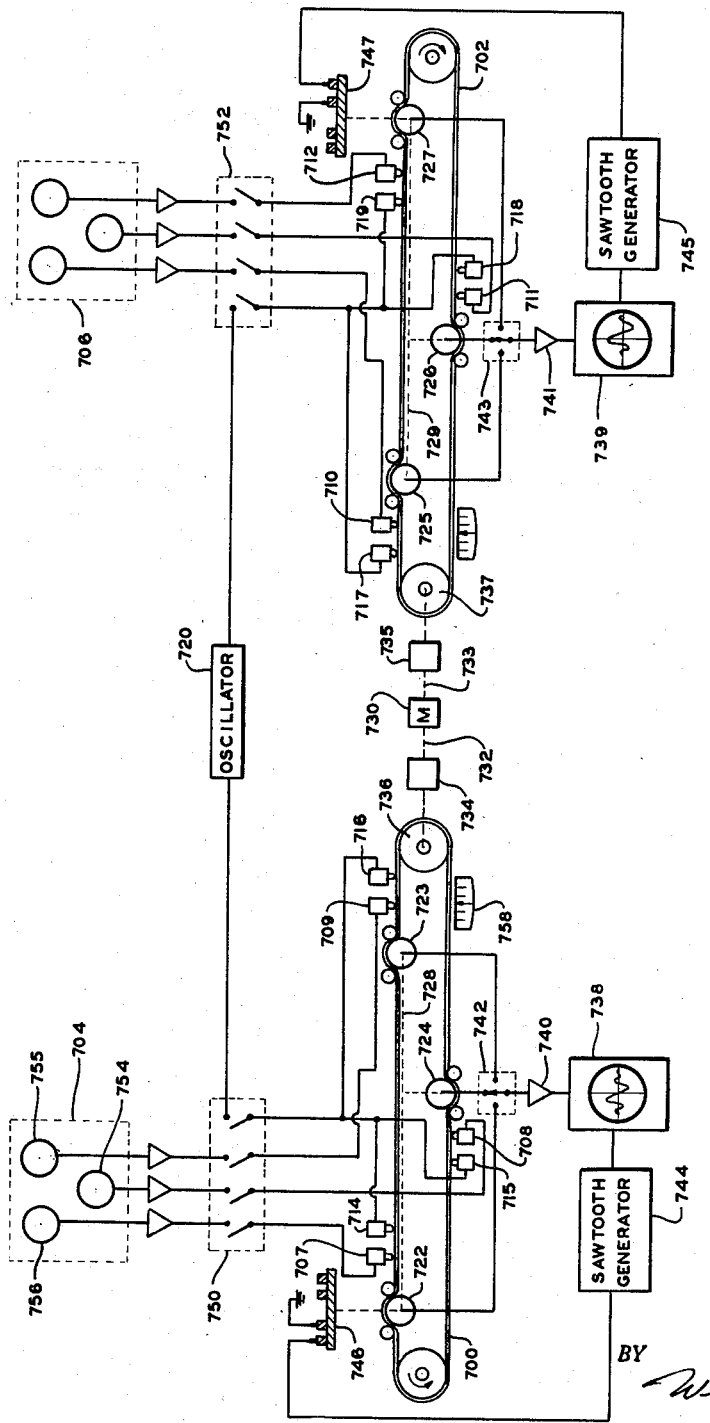
Figure 10:
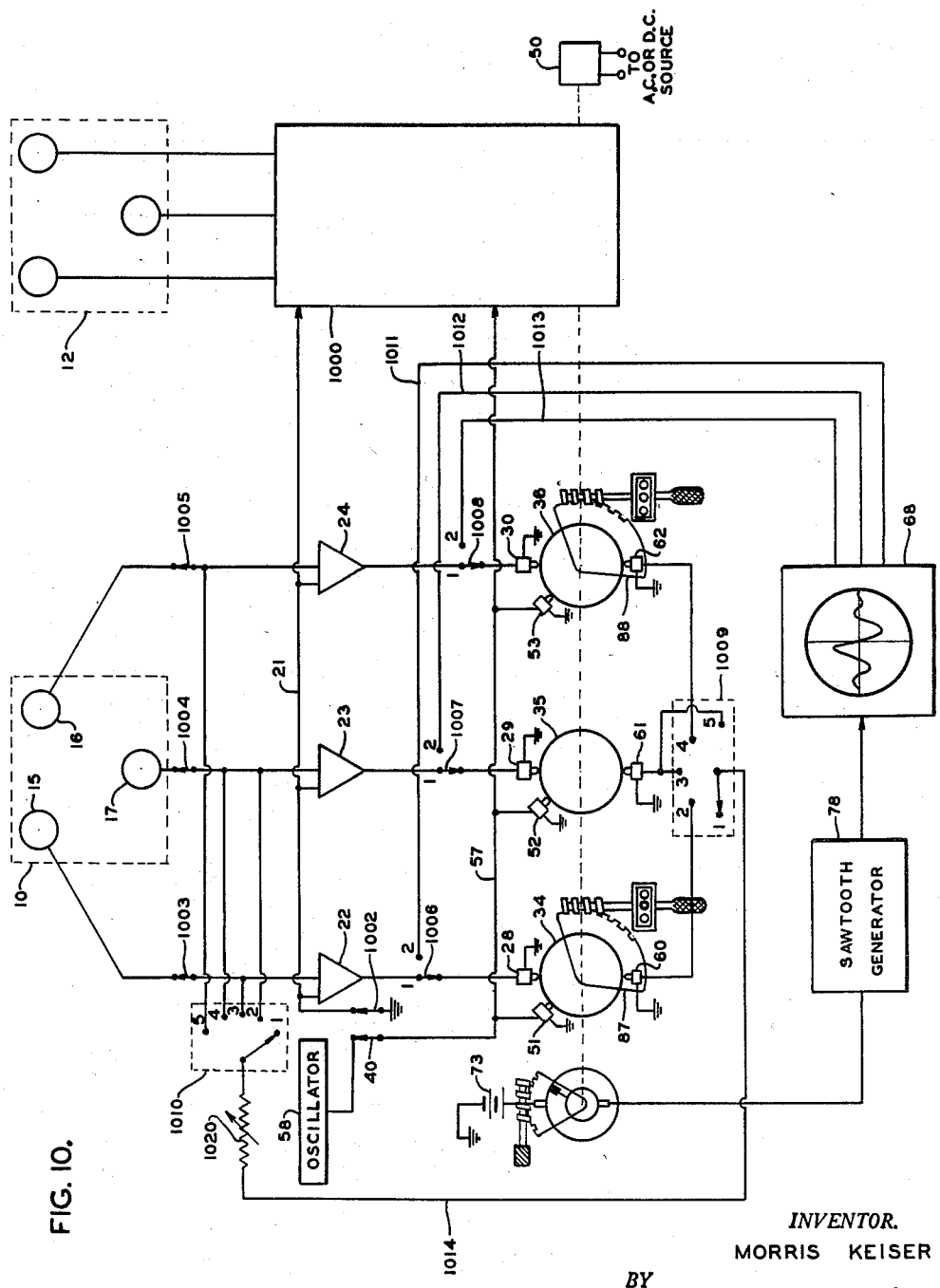

Figures 5 and 6 are cross-sectional views of the idlers and scanning wheel used with the finder of Fig. 4; the cross-sectional views taken along lines 5—5 and 6—6 shown in Fig. 4;

Figure 7 is a modified form of Fig. 4, the modification residing in reducing the number of magnetic tapes to two, as compared to six tapes used in Fig. 4;

Figure 8 is a block diagram of a position-finder wherein all steps are performed electronically by means of the electronic switches and two oscilloscopes, and the magnetic tapes are not used;

Figure 9 is an enlarged view of one of the oscilloscope screens also illustrated in Fig. 8, and Figure 10 is a modified block diagram of Fig. 1, the modification residing in the use of the recorded signals, the amplifiers being switched for reproducing in such a manner as to eliminate the phase shift error.

Figure 2:
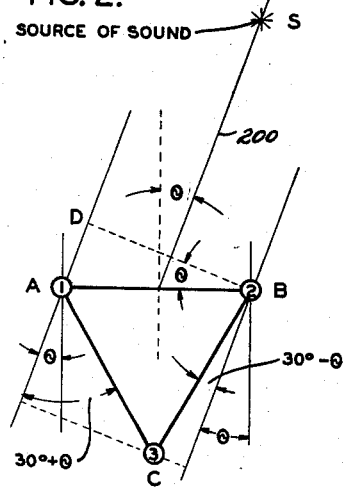
Figure 2 illustrates an equilateral triangle, microphone array and geometry of the problem which it solves.

Referring to Fig. 2, it illustrates the equilateral triangle array, the pickup microphones being positioned at the apexes 1, 2, 3 of the triangle. The determination of the azimuth of sound approach is based on the following conditions:

(a) That the dimensions of the array are small compared to the range so that the wave front of the sound approach is a plane and a correction for curvature of the wave front is negligible.

(b) That the speed of sound (Scalar) and the vertical angle of approach of the wave front is constant for the time of traverse of the sound over the array (approximately 50 milliseconds). The trace velocity V (the apparent velocity of sound in the plane of the array) is therefore constant.

In the configuration shown there are three microphones A B C at the distance $AB \equiv BC = AC$, but to provide a more general solution the microphone C is also referred to as C' and distances are separately recited. Azimuths of sound source and microphones are designated relative to a zero azimuth line from C to O shown as normal to AB and must be given suitable positive or negative values. The relation of the quantities can be most readily understood in terms of distances as they appear in Fig. 2:

$$\text{Cos } (OCB - \theta) = \frac{V(T_c - T_b)}{CB}, \text{ Cos } (OC'A - \theta)$$
$$= \frac{V(T_{c'} - T_a)}{C'A}$$
(1, 2)

The angles identified by these trigonometric functions are algebraic differences, and would be suitable to determine the azimuth, if accurate. The previous technique was to solve one of these equations, such as 2, for the angle:

$$OC'A - \theta = \arccos \frac{V(T_{c'} - T_a)}{C'A}$$
(3)

but this required accurate determination of the time, distance, and horizontal component of the velocity of sound, including meteorological observations of the temperature, humidity, etc., and considerable observation and experience in determining elevation angle of sounds from the sources of interest, and still gave only a very questionable accuracy. The present technique involves only a ratio, such as division of Equation 1 by Equation 2 as follows:

$$\frac{\text{Cos } (OCB - \theta)}{\text{Cos } (OC'A - \theta)} = \frac{T_c - T_b}{T_{c'} - T_a} \times \frac{C'A}{CB}$$
(4)

Substituting ratios $R_1$, $R_2$ to reduce length of calculations in place of $$\frac{T_c - T_b}{T_{c'} - T_a}, \frac{C'A}{CB};$$

$$\frac{\text{Cos } OCB \cos \theta + \sin OCB \sin \theta}{\text{Cos } OC'A \cos \theta + \sin OC'A \sin \theta} = R_1 R_2$$
(5)

$$\frac{\text{Cos } OCB + \sin OCB \tan \theta}{\text{Cos } OC'A + \sin OC'A \tan \theta} = R_1 R_2$$
(6)

$$\text{Cos } OCB + \sin OCB \tan \theta = R_1 R_2 \cos OC'A$$
$$+ R_1 R_2 \sin OC'A \tan \theta \quad (7)$$

$$\text{Cos } OCB - R_1 R_2 \cos OC'A = \tan \theta$$
$$(R_1 R_2 \sin OC'A - \sin OCB) \quad (8)$$

$$\frac{\text{Cos } OCB - R_1 R_2 \cos OC'A}{R_1 R_2 \sin OC'A - \sin OCB} = \tan \theta$$
(9)

$$\theta = \arctan \frac{\text{Cos } OCB - R_1 R_2 \cos OC'A}{R_1 R_2 \sin OC'A - \sin OCB}$$
(10)

As shown, C' is coincident with C, $OCA = -30$, $OCB = +30$, $CA = CB$, $R_2 = 1$; therefore:

$$\theta = \arctan \frac{\sqrt{3}/2 - R_1\sqrt{3}/2}{-R_1 1/2 - 1/2} = \arctan \sqrt{3} \frac{1 - R_1}{-R_1 - 1}$$
$$= \arctan \sqrt{3} \frac{R_1 - 1}{R_1 + 1}$$
(10a)

Another convenient calculation would assume $OCA = 0$, with same array OCB would be 60° and:

$$\theta = \arctan \frac{1/2 - R_1 \times 1}{R_1 \times 0 - \sqrt{3}/2} = \arctan \frac{1 - 2R_1}{0 - \sqrt{3}}$$
$$= \arctan \frac{2R_1 - 1}{3} \sqrt{3}$$
(10b)

Another convenient array, in the form of a right isosceles triangle or square as in Hubbard Patent No. 1,645,810, might have $OC'A = 0$, $OCB = 90°$, $C'A = CB$, in which:

$$\theta = \arctan \frac{0 - R_1 \times 1}{R_1 \times 0 - 1} = \arctan \frac{-R_1}{0 - 1} = \arctan R_1$$
(10c)

Arrays having unequal sides would require use of the ratio $R_2$ of the full formula.

By observation it would be obvious that differences must not be measured along nearly parallel lines. The formula also shows that the results would be indeterminate since $R_1 R_2$ would be nearly unity, sines nearly equal, and therefore actual value of the ratio would be nearly 0/0 and both the ratio and the angle defined by the arctan of such ratio would be indeterminate.

In the array as shown the greatest accuracy is obtained by using the ratio of the largest to the intermediate time difference. The azimuth line is drawn through the midpoint of that side of the triangle for which the time difference of arrival of sound between the ends is a minimum as shown in Fig. 2.

This angle is obtained directly by means of a slide-rule which has its scales arranged to give a direct answer for $\theta$ in degrees and minutes of the angle. Ordinary slide-rules in which the ratio is computed include a scale suitable for this purpose designated the "T" or tangent scale.

Referring to Equation 4 it is seen that the determination of $\theta$ is dependent only on a ratio of time difference. It therefore follows:

(a) that it is not necessary to have an absolute calculation of the timing system, and it is only necessary that the system operates at uniform speed during the interval of time required for the sound wave to traverse the array.

(b) that it is not necessary to know the length of the sides of the triangle—it is only necessary that they be of known ratio and that the area encompassed by the array be large enough to give adequate sensitivity in the measurement of $\theta$, but not so large as to make the assumptions made in (a) and (b), above, untenable.

(c) that the size of the array does not enter into the solution of the equation for azimuth, but that the configuration of the array is important. It is to be noted however, that the accuracy of the final results is a function of the absolute size of the array, since the measurements of the relative displacements of the respective records with respect to each other on the magnetic tape, if such is used, or on the screen of the oscilloscope, if such measurements are performed solely by means of the oscilloscope screen, are directly affected by the absolute size of the array, shorter and shorter measurements being involved as the size of the array is reduced.

Therefore, to sum up the basic principles of the system, it is especially suitable for field use which requires portability and simplicity of the equipment. The necessary reduction of the size of the arrays would impose great demands on the accuracy of the entire system and the precision of the individual components if absolute measurements were required, these demands are circumvented by the disclosed system through the use of a small array positioned in a horizontal plane and having a form of an equilateral triangle which reduces the solution of the azimuth determination to the ratio of the time differences in Equation 4. Therefore, demands, on space and time measurements, and, in turn, requirements of the constancy of speed in the recording apparatus are greatly relaxed, and, as a consequence, it becomes possible to reduce equipment to a simple combination of instrumentalities which can be very readily used in the field.

Referring now to Fig. 1, it illustrates two microphone arrays 10 and 12 placed at the ends of a base line 14. The arrays are in the form of equilateral triangles with the microphones 15 through 20 placed at each apex of the triangle. The triangular array has a fairly uniform sensitivity to all azimuth angles, so that the orientation of the array may be suited to the terrain, except that, the plane of the triangle should be as nearly horizontal as possible to avoid the necessity of applying the tilt correction to the obtained results when the array is not in a horizontal plane. The base line 14 should be approximately parallel to the plane of the incoming sound wave for maximum accuracy in determining positions of the sources of sound, the larger is the angle between the two azimuth lines, the higher is the accuracy of the results. The length of the sides of the triangle are formed by the microphones 15 through 20, and the degree of separation between the array stations, i.e., the length of base line 14, and the dimensions of the array, i.e., the distance between the microphones in each array, are all controlled by the range to be measured and the desired accuracy of the position-finder. When the position-finder is used for determining the location of relatively remote objects, the base line, as well as the spacing between the microphones in each triangular array, should be longer than when the position-finder is used for locating short ranges such as those encountered in connection with the determination of the locations of such objects as mortars and machine guns, i.e., the size of the array and the base line should be commensurate with the ranges that are to be measured. The following illustrative example is given to exemplify the order of the magnitudes of the above mentioned quantities which give satisfactory results:

For 1000 yard range (small arms)
Sides of triangle _____ yds__ 5
Base line _____ yds__ 500

Since the recording and reproducing apparatus used in connection with each array is identical, it will be sufficient to describe only one set of the recording-reproducing channels, and it will be done in connection with the left array 10. The microphones 15, 16 and 17 are connected to amplifiers 22, 24 and 23. The amplifiers are grounded through a common conductor 21 and a switch 40, this switch being used for disconnecting the recording amplifiers from the array immediately after the desired sound wave has been recorded on the magnetic tapes. This common conductor also extends to the amplifiers 25, 26 and 27 of the right microphone array 12, so that all recording channels become disconnected simultaneously when switch 40 is opened.

The audio amplifiers 22, 23 and 24 are connected to the magnetic recording heads 28, 29 and 30 which are positioned in recording relationship with respect to the magnetic tapes 34, 35 and 36. The right array 12 is provided with the similar amplifiers 25, 26 and 27, recording magnetic heads 31, 32 and 33, and magnetic loops 37, 38 and 39. Each of the magnetic loops 34 through 39 consists of a thin, flat magnetic tape, this type of magnetic tape having the advantage of permitting two-sided recording, i.e., the magnetic core of the recorder has a small air gap, and the tape passes through this air gap. All magnetic loops are mounted rigidly on a shaft 45 which is connected through a gear box 49 to a motor 50 which rotates the loops at a substantially uniform angular velocity. Motor 50, as mentioned previously, is either a D.C., governor-controlled motor or a small synchronous motor, if a source of A.C. is available. All magnetic loops are provided with erasing heads 51 through 56 which are connected in parallel through a common conductor 57 to the left side of switch 40 and supersonic oscillator 58. This oscillator impresses a signal of sufficient intensity on the erasing heads 51 through 56, to erase any recorded signals on the magnetic loops. Since oscillator 58 operates at a supersonic frequency, it may also be used as a source of A.C. biassing for the magnetic tapes during the recording cycle of the system, in which case, it is also connected through an attenuator to the recording heads 28 through 33. This connection is not shown in the figure. Since oscillator 58 is connected to the erasing heads through switch 40, opening of the latter also disconnects all erasing heads, with the result that the desired sound wave record is retained on the magnetic loops.

All the magnetic tape loops are provided with reproducing heads 60 through 65 which are used for reproducing the recorded signals on the screens of cathode-ray oscilloscopes 66 and 68. These may be connected to any of the reproducing heads of one array through a three-position switch 69 or 70 and suitable amplifiers 71 and 72. The sweep circuits of the oscilloscopes are controlled by means of commutators 74 and 76 mounted on shaft 45. These commutators thru pickup brushes 81 and 83 supply the necessary triggering pulses for the saw-tooth generators 78 and 80, the outputs of which provide the time axes for the oscilloscopes. In order to adjust the time axis on the oscilloscope screens, commutating brushes 82 and 84 are mounted on adjustable segments 85 and 86 which may be rotated around shaft 45, and thus move the position of the saw-tooth waves with respect to the reproduced signals, which is equivalent to shifting the latter on the screen of the oscilloscopes.

When the operator of the position-finder hears the expected sound, such as firing of a distant gun or a burst of machine gun fire, he opens switch 40, and, since his time of reaction to the sound is in the order of 0.3 to 0.5 second, sufficient time elapses between the actual recording of the sound wave and disconnecting of the recording channels, with the result that the recording channels record the desired sound wave on the magnetic loops before they are disconnected. At the same time, the dimensions, or the length of the recording loops is made to provide the necessary "time reservoir," so that the recorded sound remains on the tapes and is not erased by the erasing heads prior to the opening of switch 40. Accordingly, the length of the magnetic loops is controlled by the time required for opening switch 40 by the operator and the speed of motor 50 during the recording period. Since it is not necessary to record and to reproduce faithfully the entire frequency spectrum of the sound, the minimum recording speed of the magnetic loops may be relatively low, which diminishes the required diameter of the magnetic loops. This minimum permissible recording speed is determined by first determining the useful range of frequencies composing the sought sound wave, and adjusting the speed so that the maximum frequency is recorded faithfully on the tape. Thus the useful range of frequencies must be recorded and reproduced faithfully since it obviously determines the wave form of the sought signal. For mortar blast such range is in the order of from 30 to 360 cycles per second.

Opening of switch 40 completes the recording cycle of the system and the desired signals have now been "trapped" or recorded on all the loops in the time relationships corresponding to the times of arrival of the sound wave at the respective microphones. It now remains only to determine the difference between the positions of the signals on the respective loops, and this is accomplished by using the oscilloscopes 66 and 68 in the respective array channels. The procedure for measuring the differences between the times of arrival of the sound waves in the respective channels is accomplished as follows: magnetic loop 35 is connected through the reproducing head 61, switch 69, and amplifier 71 to the vertical deflection plates of oscilloscope 66, and any desired portion of the recorded sound wave 79 is positioned under the hairline provided on the screen of the oscilloscope. Intersection of the zero axis is used here as the point of reference for aligning all waves with the reference line. As mentioned previously, the alignment of wave 79 is accomplished by adjusting the angular position of sector 85 with respect to commutator 74 which shifts the saw-tooth wave either to the left or to the right with respect to the signal. Once the sound wave 79 has been properly positioned on the screen of the oscilloscope, sector 85 remains fixed, and switch 69 is connected either to loop 36 or 34 for reproducing on the screen of oscilloscope 66 the signals recorded on these loops in identically the same manner. Since the position of the saw-tooth wave now remains fixed, proper centering of the signals on the oscilloscope screen is accomplished by adjusting the time of appearance of the signal on the vertical deflection plates of the oscilloscope by manually operating sector 87 or 88. These sectors act as supporting brackets for the reproducing heads 60 and 62, respectively, and are connected by means of worm gears 89 and 90 to mechanical counters 91 and 92, which indicate the number of turns given to the worm gears 89 and 90 for positioning the signals recorded on the magnetic tapes 34 and 36 in identical phase relationship with the sound wave 79. When this is accomplished, the readings of the counters 91 and 92 are used in Equation 4 for computing the position of the azimuth line 200 indicated in Fig. 2.

It has been mentioned previously that, in order to decrease the diameter of the magnetic loops, it is desirable to have the recording speed as low as feasible with the sound wave being recorded. Speed of the motor is determined by the frequency of the signal, the size of the array, and the velocity of sound; the speed must be sufficiently high to give an instrumental resolution equal to the angular accuracy required. If the reproducing speed is the same as the recording speed, the repetition rate of the wave may not be high enough for producing persistent images on the oscilloscope screen. Moreover, it is desirable to reproduce the entire sound transient on the screen, which means that, with the saw-tooth wave period adjusted to give high repetition rate, the reproducing speed of the tape must be higher than the recording speed. For these reasons, motor 50 is provided with a gear box 49 which is shifted into a high speed position when the tapes are used for reproducing the recorded signals.

In order to obtain the highest degree of accuracy possible in connection with a small array, amplifiers 22 through 27 should be adjusted to produce the images on the screen as nearly identical as possible. This can be accomplished by phasing the recording channels so that all the traces or signals for any one array "take-off" in the same direction, i.e., the phasing of the input and output circuits in the amplifying channels should be identical. Moreover, since the azimuth angle is determined by measuring the degree of linear displacement between the respective records on the individual magnetic tapes, it is important that the complete recording channels, which include microphones 15, 16, 17, amplifiers 22, 23, 24, and the magnetic recording heads 28, 29, and 30 introduce identical phase shifts. This may be accomplished by impressing an artificially created sound on all microphones simultaneously, and by comparing the results on the screen of oscilloscope 66. If the difference in the "take-off" times between the respective channels is greater than can be tolerated with the desired accuracy of the apparatus, the phase shifts of the channels must be adjusted by changing the parameters of the circuits in amplifiers 22 through 27. The channels of any one array are adjusted to about the same over-all sensitivity, so that the records of all the traces will have approximately equal amplitudes. Because the characteristics of all the recording and reproducing channels are identical, or can be adjusted to identity, the traces on the oscilloscope screen are also identical, which permits a more accurate determination of the time difference. In Fig. 10, the phase error introduced by the recording channels is eliminated altogether, as will be described later.

The maximum excursions of the traces should be limited to the boundaries of the oscilloscope screen, so that the record may be read with peaks and valleys, or the points where the velocity of the cathode-ray beam is maximum, as points of identity. For longer ranges, the frequency spectrum of the recorded sound pulses is generally lower, and the initial excursion of the trace from its zero position is more gradual. As a result, the instant of "take-off" is uncertain and difficult to determine, and when the sound wave has a form as indicated above, it is preferable to align the records of the wave by using the peaks or valleys of the sound waves as the points of identity in determining the difference between the times of arrival of the sound at the respective microphones. This is illustrated on the screen of an oscilloscope 68 in Fig. 1, with the peak of the sound wave coinciding with the hairline of the oscilloscope. However, this method is not applicable when the noise level is high and non-uniform over the array, and, as a consequence, it is not possible to make the traces reproduced on the oscilloscope screen identical. When this is the case, it may be preferable to use, as points of identity, the place where the trace crosses its zero axis with the maximum velocity, as illustrated on the screen of oscilloscope 66. It is obvious that at this point the signal-to-noise ratio will be a maximum, and the error introduced by a phase shift, resulting from the phase addition of signal and noise pulses, will be at a minimum.

In the acoustic, position-finding system disclosed in Fig. 1, the recorded signals are reproduced by means of the reproducing heads and a single reproducing amplifier connected between the reproducing heads and the oscilloscope. The system may be simplified by using the recording heads 28 through 33 and one of the recording amplifiers, such as amplifier 23, in the left array and amplifier 26 in the right array for recording as well as for reproducing the signals by interposing switches making such operation of the circuits possible, and by mounting two of the recording-reproducing heads in each array, such as 28 and 30, on the adjustable sectors 87 and 88. The disadvantage of such arrangement resides in the fact that after each determination of the location of a source of sound the two heads 28 and 30 will be found in the displaced positions with respect to head 29, and it will be necessary to move them back to their original positions before making the next recording, if the next recording is to be made with the counters 91 and 92 in zero reading positions.

An additional contemplated modification of the system disclosed in Fig. 1 relates to the commutators 74 and 76 which furnish the synchronizing pulses for the saw-tooth generators 78 and 80. As illustrated in the figure, when brushes 81 and 82 (left commutator) connect a source of potential 73 to saw-tooth generator 78, the condenser-discharging tube of saw-tooth generator 78 (or 80) is made conductive, the saw-tooth generating condenser is discharged, and there is a resumption of the charging period of the condenser. Thus a single saw-tooth wave is generated for each revolution of commutator 74. Since the desired signal occupies only a small part of the magnetic loop, the parameters of the saw-tooth generator should be preferably adjusted to complete the generation of the linear portion of the saw-tooth wave in that interval of time which is actually occupied by the signal, and remain idle during the remaining portion of the revolution of the loop. This mode of operation of the saw-tooth generator eliminates all extraneous signals from the screens of the oscilloscopes, and produces a much faster sweep and the concomitant finer definition of the wave form of the desired signal. To accomplish this result, source 73 may be connected in series with the charging circuit of the saw-tooth generating condenser, and the width of segment 75 adjusted to produce the linear portion of the saw-tooth wave of the desired duration. The condenser is then discharged in a well-known manner through a gas-filled tube which becomes ionized when the voltage across the condenser reaches a predetermined value.

Figure 3:
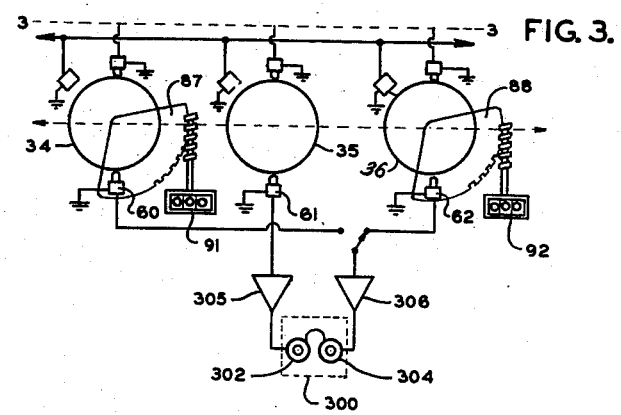
Figure 3 is a modified form of Fig. 1, the modification residing in the substitution of the earphones for the oscilloscopes used in Fig. 1.

Fig. 3 discloses an additional modification of the position-finding system disclosed in Fig. 1. Only the reproducing portion of one array is illustrated in Fig. 3, and the connections between the array and Fig. 3 are indicated by a dotted matching line 3—3 in Figs. 1 and 3. The modification resides in substituting earphones 300 for oscilloscope 66 (and 68 in the right array), and impressing the signal from tape 35 on the left earphone 302, and the signal from tape 36 on the right earphone 304. As sector 88 is turned, the operator hears the sound produced by the earphones occur simultaneously in both ears. The same procedure is followed with the signal recorded on tape 34. The obtained readings of the counters 91 and 92 are used in the same manner as those obtained in Fig. 1, i.e., they are used in Equation 4. Amplifiers 305 and 306 must have substantially the same frequency response characteristics, gain, and phase shifts in order to produce two comparable signals. The method of adjusting the signals by using earphones is known in the art as the "binaural listening" method.

Figs. 4, 5 and 6 disclose an alternative system for obtaining locations of the sources of sound. The main difference between Fig. 1 and Figs. 4, 5 and 6 resides in the fact that while in Fig. 1 the reproducing heads are normally stationary (except for the adjustment of the sectors 87 and 88), and the magnetic tapes are rotated, in Figs. 4, 5 and 6, the tapes are stationary and the reproducing heads are rotated during the signal-reproducing cycle of the system.

Referring to Fig. 4, the microphone arrays 400 and 402 are similar to the microphone arrays 10, 12 in Fig. 1, and, as in the case of Fig. 1, they are connected to the amplifiers 405 through 410 which impress the transformed sound waves on the recording heads 412 through 417. The recording heads are aligned properly with respect to each other in such a manner that the center line joining the three recording heads of the left array is at a right angle to the longitudinal center lines of the magnetic tapes 420, 421 and 422, and the center line joining the three heads of the right array is at a right angle to the longitudinal center lines of the magnetic tapes 424, 425 and 426. The magnetic tapes 420, 422, 424 and 426 are provided with the linear scales, as illustrated in Fig. 4. The magnetic tapes are mounted on idling rollers 430, 432, and on pulleys 434 through 439, the pulleys being connected to each other by means of clutches 428, 429, 431 and 433. These pulleys are connected also through clutches 440, 441, and gears 442, 443, and 444 to a governor-controlled direct current motor or synchronous motor 448 which drives the tapes at a uniform linear velocity in the direction indicated by the arrows. As in the case of Fig. 1, the erasing heads 450 through 455 are placed in the proximity of the recording heads and the alternating current potential of supersonic frequency is impressed upon them by an oscillator 458 for restoring magnetization of the tapes to neutral state. Ganged switches 460 and 461 are interposed between the amplifiers and the recording heads, and between the supersonic frequency oscillator 458 and the erasing heads. From the description given thus far, it is apparent that the recording channels disclosed in Fig. 4 are identical with recording channels illustrated in Fig. 1.

All magnetic tapes are made to pass over idlers 464 through 475, and scanning wheels mounted between the idlers, the construction of which is illustrated more clearly in Figs. 5 and 6, Fig. 5 being the side, cross-sectional view, and Fig. 6 the vertical, transverse cross-sectional view of one idler-scanning-wheel combination. Because of the presence of tension rollers 476 and 477, the magnetic tapes are made to follow a considerable portion of the cylindrical surface of the idlers as illustrated in Fig. 5. The idlers 464 through 475 are rotatably mounted on shafts 478 and 479. These shafts are connected to motor 448 by means of belts 484 and 485 and the appropriate pulleys as illustrated in Fig. 4. The shafts are connected also to commutators 486 and 487 which accomplish the same function as commutators 74 and 76 in Fig. 1, except that the commutators 486 and 487 do not have the adjustable segments 85 and 86 of Fig. 1, since the position of the selected signal on the screen of oscilloscopes 488 and 489 is adjusted now by shifting the tapes over the idlers and pulleys.

It should be noted here, before proceeding with the description of the additional systems, that the system disclosed in Fig. 4 does not introduce any appreciable error due to the slippage of the magnetic tapes during the recording interval and subsequent to this interval. Experimental results indicate that such slippage is within the limits of the overall accuracy of the system. This is due to the fact that the recording period itself, as mentioned previously, occupies a period of time which is in the order of at most 50 milliseconds, and since motor 448 is disconnected only a few milliseconds after the expiration of the recording period, the system comes to a standstill very quickly with the result that the slippage, if any, is insignificant.

Referring to Figs. 5 and 6 which illustrate one set of idlers 464, 465 and a scanning wheel 500, the idlers are rotatively mounted on shaft 478 by means of roller bearings 501 and 502, while scanning wheel 500 is positioned between the two idlers and is keyed to shaft 478. Accordingly, the scanning wheel revolves with shaft 478. The tension rollers 476 and 477 are rotatively mounted on arms 503.

The magnetic tape 420, during the recording process, passes over the idlers 464 and 465 which are rotated by the tape. The scanning wheel 500 has a slightly smaller diameter than the idlers, with the result that the scanning wheel is free to revolve without touching the tape during the recording and reproducing cycles of the system. The magnetic heads 504 and 505 are mounted on the rim of the scanning wheel 500 with the magnetic core of the reproducing heads protruding through the rim of the scanning wheel, so that only a small air gap separates the magnetic cores from the tape when they are in reproducing relationship with respect to the tape. Only two magnetic heads are illustrated in Figs. 5 and 6, but the number of the reproducing heads may be increased to any desired number depending upon the desired repetition rate of the signal. This is determined primarily by the characteristics of the fluorescent screens in the oscilloscope tubes 488 and 489 and the speed ratios of the driving mechanisms. The magnetic heads are connected in series, with one terminal of the series circuit grounded at 506 through shaft 478, and the other brought out through a slip ring 508, brush 509 and conductor 510, the latter being connected to one of the terminals of a three-position switch 490, Fig. 4. Depending upon the position of this switch, any one of the three scanning disks may be connected through an amplifier 491 to oscilloscope 488, which reproduces the signals on its screen in a manner described in connection with Fig. 1.

The operation of the position-finding system disclosed in Figs. 4, 5 and 6 is as follows: the microphone arrays 400 and 402 are "staked out," each in a substantially horizontal plane, at the ends of base line 14 and the system is made ready for operation by closing the circuits of all amplifiers and the ganged switches 460 and 461 which connect the microphone arrays to the recording heads. When the operator hears the expected sound, he opens switches 460 and 461 which disconnect the arrays from the recording heads, and the supersonic oscillator 458 from the erasing heads, thus leaving the desired signal in the recorded form on all six magnetic tapes. Operation of the switches 460 and 461 also disconnects the driving motor 448 (the motor switch is not indicated in the drawing), with the result that the tapes come to a standstill shortly thereafter. The displacement of the signal on the magnetic tapes 420 and 422 with respect to the signal on tape 421 is measured in the following manner: clutch 440 is disconnected and motor 448 is started again, with the result that all reproducing heads mounted on shaft 478 are now revolved on their scanning disks, such as disk 500 shown in Fig. 5. With the clutches 428 and 429 in the engaged positions, the three magnetic tapes 420, 421 and 422 are moved by hand by engaging knurled knobs 492 and 495 until the desired signal appears on the screen of oscilloscope 488, which takes place when magnetic tape 421 is moved into such a position that the desired signal is positioned directly over idlers 466 and 467, Fig. 6, and the reproducing heads 505 and 504 are subjected to the influence of the transverse flux produced on tape 421 during the recording process. This flux induces corresponding electromotive forces in the reproducing heads and the induced voltage is impressed on amplifier 491 which impresses the amplified signal on the vertical deflection plates of oscilloscope 488. The image is centered on the oscilloscope screen by using either the maximum amplitude or the maximum velocity of travel of the cathode-ray beam as a reference point. After the signal recorded on tape 421 has been properly centered on the screen, the reading on the vernier plate 493 is noted, clutch 428 is disconnected, and tape 420 is moved by means of knob 492 until the signal recorded on tape 420 is reproduced on the screen of oscilloscope 488 in a manner similar to that of the signal from tape 421. At this instant, the three-position switch 490 is on its right contact, and is connected to conductor 510, thus connecting amplifier 491 and the oscilloscope to the reproducing heads 505 and 504. Switch 490 now may be switched back and forth between the right and center contacts in order to compare more carefully the exact positions of the two signals on the oscilloscope screen. When the exact over-lapping of the images is obtained, tapes 421 and 420 are properly aligned and, therefore, vernier 493 may be read now once more in order to determine the linear displacement given to tape 420 during its adjustment to the second position. The same procedure is followed in connection with tape 422, clutch 429 being disconnected when tape 422 is moved to that position which reproduces the recorded signal in the desired position on the screen of the oscilloscope. Vernier 494 is used for measuring the linear displacements of tape 422. The readings obtained on the verniers 493 and 494 are used in Equation 4 in exactly the same manner as the readings obtained on the counters 90 and 91 of Fig. 1.

In Fig. 4, displacement of the magnetic tapes is measured by means of verniers 493 and 494, with the magnetic tapes having the scales etched on their outer edges. This vernier arrangement may be replaced with the counters arrangement used in Fig. 1, in which case, the counters 91 and 92 are provided with the worms 89 and 90 normally held out of engagement with the gears 87' and 88', attached to pulleys 434 and 436, by coil springs. When it is necessary to move tapes 420 and 422 for proper centering of the signals on the oscilloscope screen, the operating shafts of the counters are pressed inward against the pressure of the springs until they engage the teeth of gears 87' and 88' attached to the pulleys 436 and 434, and when the gear engagement is established the shafts of the counters are turned in the desired direction until the signals are properly centered on the oscilloscope screen. The readings of the counters are then used in Equation 4.

Fig. 7 discloses a simplified version of the position-finding system disclosed in Fig. 4, the simplification residing in the reduction of the number of the magnetic tapes used for recording the intercepted sound wave. In Fig. 4 six magnetic tapes are used, while in Fig. 7 the same result is accomplished by means of two tapes 700 and 702. The remaining elements of the systems disclosed in Figs. 4 and 7 are identical. The sound-intercepting arrays 704 and 706 are connected through amplifiers to recording heads 707 through 712 which record the signals impressed upon them by the amplifiers on different portions of the two tapes. The erasing heads 714 through 719, positioned in front of the recording heads, are connected to a supersonic oscillator 720, the erasing of the signals being performed by them directly in front of the recorded heads, which provides the necessary time reservoir on the magnetic tapes. The scanning wheels 722 through 727, with their magnetic heads, are placed on the lagging sides of the recording heads. As in Fig. 4, they are connected through shafts 728 and 729 to a motor 730 which is also connected through shafts 732 and 733, and clutches 734 and 735 to the driving pulleys 736 and 737 of the magnetic tapes. The reproducing heads are connected to oscilloscopes 738 and 739 through amplifiers 740 and 741 and three-position switches 742 and 743. The saw-tooth oscillators 744 and 745 are controlled by the commutators 746 and 747 in a manner similar to that illustrated in Figs. 4 and 1. Since in Fig. 7, during the reproducing cycle of the system, the magnetic tapes may be moved by hand back and forth in order to adjust the position of the recorded signal on the oscilloscope screen, it is unnecessary to have the adjusting segments, such as segments 85 and 86, Fig. 1, for commutators 746 and 747.

The operation of the system disclosed in Fig 7 does not differ materially from the operation of the system disclosed in Fig. 4. The microphone arrays impress the intercepted signal on the recording heads and the operator, upon hearing the sound, disconnects the ganged switches 750 and 752 and a switch for motor 730 (not shown), with the result that the desired signal is retained on the two magnetic tapes. The operator is now ready for determining the displacements of the recorded signals on the magnetic tapes. Since the magnetic tapes are moved at a relatively low speed, they stop quickly after motor 730 is disconnected and the operator soon learns how much he has to move the magnetic tapes in the direction opposite to their normal rotation during the recording period in order to position the desired portion of the magnetic tape under the scanning wheel 724. This scanning wheel is placed on the lagging side of the recording head 708 which is connected to a microphone 754. It may be recalled that the measurement of the amount of displacement of the recorded signals is always performed by orienting the signal from microphone 754 first, and then measuring the displacements of the signals produced by the microphones 755 and 756 with respect to the signal produced by microphone 754. The same procedure is followed in the system disclosed in Fig. 7 with the tape 700 being moved by hand until the signal from microphone 754 is properly aligned with the scanning wheel 724, by observing the screen of oscilloscope 738 connected to the scanning wheel at this instant through amplifier 740 and switch 742. Since all three signals are recorded on the same magnetic tape, it may be found convenient to record the signal impressed on the recording head by microphone 754 in 180° phase relationship with respect to the signals impressed by the microphones 756 and 755, this phase relationship facilitating the identification of the signals on the magnetic tape. After the signal from microphone 754 has been properly aligned on the screen of oscilloscope 738, vernier 758 is read, and the tape is shifted to the position which aligns the signal from microphone 756 with the scanning wheel 722. When this is accomplished, vernier 758 is read once more which gives the displacement between the signals picked up by microphones 754 and 756. The same procedure is used for measuring the displacement between the signals from the microphones 754 and 755, and the obtained readings are used in Equation 4.

Fig. 8 discloses an additional modification of the position-locating system in which all steps are performed by electronic means, and recording of the sound waves on the magnetic tape is eliminated. As in all prior figures, two microphone arrays 800 and 802, properly positioned with respect to the base line 14, and each oriented in a horizontal plane, are used in intercepting the desired sound wave, six amplifiers 803 through 808 being used for amplifying the intercepted signals. The amplified signals from the amplifiers 803, 805, 806 and 808 are impressed on the electronic switches 809 and 811, respectively, which are so constructed that they key the outputs of the amplifiers connected to them in the desired alternate sequence, and also combine the audio signal with the rectangular waves generated by the switches. A detailed description of the electronic switches suitable for this purpose may be found in a pamphlet titled "Electronic Switch and Square Wave Generator, type 185-A," by Allen B. DuMont Laboratories, Passaic, New Jersey. Two double-beam oscilloscopes are used for "televising" the currents flowing in three output circuits of each array. Microphone 831 is connected directly to one set of the deflection plates which produce a trace 902, Fig. 9, on the screen of oscilloscope 814. For a more detailed description of the double-beam cathode-ray tubes reference is made to "Cossor Double Beam Oscilloscope," by A. C. Cossor, Ltd., London, England. The audio signals and the rectangular waves appearing in the output of switch 809 are impressed on the second set of the deflection plates of oscilloscope 814, so that two separate "televised" images 900 and 901 of the intercepted sound wave are reproduced on the screen of the oscilloscope, each image corresponding to the signal appearing in the output of one microphone producing it. In order to obtain such results, switch 809 keys the outputs of amplifiers 803 and 805 in alternate succession, so that during the first portion of the rectangular wave, which is also generated by switch 809, the cathode-ray beam is tracing on the oscilloscope screen a portion of signal 900 from microphone 830. When the rectangular wave drops to a lower level, the output of amplifier 803 is cut off, and the output of amplifier 805 is allowed to pass through switch 809, with the result that during the succeeding period the cathode-ray beam produces a portion of trace 901 corresponding to a signal from microphone 832. The switching frequency of switch 809 is adjusted to produce substantially continuous traces of the two signals 900 and 901. The oscilloscope screen must have maximum retentivity, so that the generated images may be retained on the screen for a sufficient length of time to allow the operator to read the relative displacements of the two traces with respect to the third trace 902. The oscilloscope screens are provided for this purpose with the vertical scale lines 903. The saw-tooth oscillator represents a component part of oscilloscope 814 and the recurrence of the saw-tooth wave is adjusted to reproduce the entire sound phenomenon intercepted by the array in a single sweep. The circuits and functioning of the right array 802 are identical to the circuits of the left array.

Fig. 10 discloses an additional modification of Fig. 1, the modification residing in the fact that the reproducing amplifier 71 of the left array, and 72 of the right array, Fig. 1, have been eliminated and the recording amplifiers 22 through 27 are now used for recording as well as for reproducing the recorded signals. Moreover, switching arrangements interposed between the sound arrays, the amplifiers, and the recording and reproducing heads are so arranged that the amplifiers, during the reproducing period, are interchanged or criss-crossed so that the previously described phase error which may be introduced by the amplifiers is automatically cancelled during the reproducing period. Fig. 10 discloses in detail only the left array, the recording-reproducing channels of the right array being illustrated as a block 1000, since they are identical to those of the left array, which is described below. Since by far the larger portion of the individual components of the systems disclosed in Fig. 10 is identical to the corresponding components used in Fig. 1, they are identified by the same numbers in Fig. 1 and 10, and only the added switches are identified by the new numerals.

During the recording period, sound array 10 is connected to the recording heads 28, 29 and 30 through the amplifiers 22, 23, and 24, and closed switches 1002 through 1008. Switch 40 is in closed position, and the five-position switches 1010 and 1009 are both on their respective contacts No. 1. Accordingly, with the switches in the positions described above and indicated in the drawing, the sound array 10 is connected to the recording heads 28, 29 and 30 through the amplifiers 22, 23 and 24, and recording of the desired sound wave is made in the usual manner. Oscillator 58 is connected through switch 40 to the erasing heads 51, 52 and 53, so that the heads function in a manner previously described in connection with Fig. 1. When the operator hears the expected sound, he opens switch 40, and 1002 through 1008, with the result that recording of any sounds intercepted by the sound array 10 and the erasing process are stopped. The desired sound wave has been recorded or "trapped" on the magnetic tapes, and it is now necessary to compare the phase relationship of the recorded signals by impressing them, one at a time, on oscilloscope 68. Switch 1002 is now closed and the multiple-contact switches 1010 and 1009 are now turned to contact No. 3, while switches 1006, 1007 and 108 is turned to contact No. 2. Thus the outputs of amplifiers 22 are connected to oscilloscope 68 over conductor 1011, and the reproducing head 61 is connected through contact 3 of switch 1009, conductor 1014, and contact 3 of switch 1010 to the output circuit of amplifier 22. Accordingly, the reproducing circuit of the magnetic head 61 is now as follows: magnetic head 61, contact 3 of switch 1009, conductor 1014, contact No. 3 of switch 1008, amplifier 22, contact No. 2 of switch 1006, conductor 1011 and oscilloscope 68. It will be noted that only one reproducing head, head 61, is connected to oscilloscope 68 at this time, the circuits of the reproducing heads 60 and 62 being open at the multiple-contact switches 1010 and 1009. It should be also noted that while recording of the sound wave at the magnetic tape 35 has been accomplished with the aid of amplifier 23, amplifier 22 is used when the signal recorded on tape 35 is reproduced. This is the criss-crossing of the amplifiers mentioned previously.

The same criss-crossing of the amplifiers is followed when the signals recorded on the magnetic tapes 34 and 36 are reproduced on the screen of oscilloscope 68, amplifier 23 being used for reproducing the signal recorded on tapes 34 and 36, and amplifiers 22 and 24 for reproducing the signal recorded on tape 35. Thus the phase difference which may be introduced by the recording amplifiers 22, 23 and 24 is now eliminated during the reproducing cycle by interchanging the amplifiers during the reproducing cycle. Since the signal recorded on tape 36 is compared to the signal recorded on tape 35, reproducing head 61 must be switched over to the input of amplifier 24 at this time, so that amplifier 24 is used with head 61, while amplifier 23 is used with head 62. This is accomplished by turning switches 1010 and 1009 to No. 5 and No. 4 positions, respectively. The multiple-contact switches 1010 and 1009 are "ganged" switches, so that they are operated to the same contact positions simultaneously. These switches are arranged for quick comparison of the phase relationship between the signals recorded on the tapes, this comparison being accomplished by rapid oscillation of switches 1009 and 1010, first, between contacts 2 and 3, and then between contacts 4 and 5, which produces rapid flashing of either one signal or the other on the oscilloscope screen. Switches 1006, 1007 and 1008 are also "ganged" to switches 1009 and 1010 for accomplishing this result.

The intensity of the signal intercepted by the sound array 10, in the majority of cases, is such that higher decibel gain in amplifiers 22 through 24 is required during the recording cycle than during the reproducing cycle. An attenuating non-inductive resistance 1020 is inserted in series with conductor 1014 for reducing the amplitude of the signals impressed on the amplifiers to the desired volume.

While the amplifier switching arrangement has been illustrated in connection with apparatus similar to that disclosed in Fig.1, it should be understood that it is equally applicable to the apparatus disclosed in Figs. 4 and 7.

It is believed that the construction and operation of the ranging systems, as well as the many advantages thereof, will be apparent from the foregoing description. It should be understood that while the invention has been shown in several preferred forms many further variations will be apparent to those skilled in the art.

What is claimed is:

1. In combination, a plurality of records, common driving means therefor, a translating device for each record, means for adjusting the relative angular position of said translating device with respect to said record, indicating means coupled to said translating device to indicate an adjustment, a reproducing circuit including a cathode-ray oscilloscope and a sawtooth generator connected to said oscilloscope, a switch for connecting said reproducing circuit with any one of said translating devices, a commutator operated by said driving means for controlling said sawtooth generator, means for adjusting the relative angular positions of commutator, translating device, and record, for selecting different portions of the reproduced record, displayed on said oscilloscope.

2. A sound ranging system for locating the azimuth of a source of sound, including three microphones each one of which is placed at the apex of an equilateral triangle, a recording channel connected to each of said microphones, said recording channel including an amplifier, a magnetic recording head and a magnetic tape in the form of a loop placed in recording relationship with respect to said recording head, an erasing head for each of said recording channels, an oscillator connected to all of the erasing heads, a multiple contact switch for simultaneously disconnecting said microphones from said recording channels, and said oscillator from said erasing heads; a reproducing head for each of said recording channels, an oscilloscope for said microphones, a switch for connecting any one of the reproducing heads to said oscilloscope, a common driving shaft mechanically interconnecting all of said loops, and a driving means connected to said shaft.

3. A system for determining the azimuth of a sound wave including a microphone array having a plurality of microphones, a recording channel connected to each microphone, each of said channels including an amplifier, a magnetic recording head, and a magnetic recording medium for recording said sound wave as a plurality of magnetic records, the number of said records corresponding to the number of said microphones, a reproducing head in reproducing relationship with respect to each of said records, means connectable to said reproducing heads for measuring the displacements of all records except one with respect to the one remaining record, said means including a switch for connecting the reproducing heads of the records that are being compared to the inputs of the amplifiers in the corresponding recording channels in an interchangeable manner, such as amplifier No. 1 connected to reproducing head No. 2, and amplifier No. 2 is connected to reproducing head No. 1.

4. A system as defined in claim 3 in which said means further includes an oscilloscope and wherein said switch also connects the output of one amplifier at a time to said oscilloscope.

5. A combination including first, second and third microphones, said microphones forming a microphone array, first, second and third recording channels connected to the respective microphones, each of said channels including an amplifier, a recording device, and a moving record member, first, second and third reproducing devices in reproducing relationship with respect to said record member, means for comparing the relatvie positions with respect to each other of the records produced by said channels on said record member, and a switch for connecting said first reproducing device with the second amplifier, said second reproducing device with said first and third amplifiers, and said third reproducing device with the second amplifier during the comparing cycle of said combination.

6. In a sound ranging system, a plurality of spaced microphones for picking up sound waves from a source of sound to be located, a loop type magnetic recording member for each microphone, recording and erasing magnets for each recording member, means for driving the members to record and erase the outputs of the microphones, means for disabling all of the magnets to leave a record of the wave form of the sound from the source on each of the members, visual reproducing apparatus for selectively scanning the members to identify the recorded wave forms of said sound, means for bringing a plurality of the identified wave forms into accurate visual alignment, registering devices operated in accordance with the operation of the aligning means whereby the differences in arrival time and hence the location of the sound may be determined.

7. A system for determining the azimuth of arrival of a sound wave including an equilateral triangle microphone array oriented in a horizontal plane and having a microphone positioned at each apex of the triangle, a recording channel connected to each microphone, each of said channels including a magnetic recording head and a magnetic tape, said magnetic tapes being mounted on a common rotating shaft whereby said sound wave is recorded on three tapes as three individual records of said wave, the position of said records on said tapes corresponding to time of arrival of said wave at each microphone of said array, a reproducing head for each of said tapes which may be rotated relative to its associated tape to reproduce the sound wave recorded thereon and visual reproducing means connectable to any one of said reproducing heads, two of such tapes being calibrated, and means to uncouple said tapes from said common shaft, whereby said tapes may be adjusted to superpose said waves and to determine the difference in time of recording from the calibrations on said tape.

8. In the method of obtaining azimuth of a sound wave by means of a triangular microphone array having three microphones positioned at three apex points of said array respectively and a separate magnetic recorder coupled to each of said microphones to produce a magnetic record from the output therefrom, the steps which include: transforming said sound wave into three, separate voltage waves at said three points, the phase relationship between said voltage waves corresponding to the times of arrival of said sound wave at said three points, recording said three voltage waves as three independent magnetic records, measuring the phase differences between the two voltage waves and the third voltage wave respectively by measuring their relative position on two of said records with respect to the recorded position on said third record and deriving the azimuth of said sound wave from the ratio of said differences, whereby said azimuth is determined solely by the relative positions of said sound wave on said records.

9. The method of obtaining the azimuth of a source of sound wave which includes the steps of transforming said sound wave at a station into three separate voltage waves at three fixed points triangularly displaced with respect to each other, transforming said voltage waves at said station into three corresponding visual images of said voltage waves, said images being displaced with respect to each other in accordance with the time of arrival of said sound wave at said three points, measuring at each station the displacements of the two images with respect to the third image; and deriving the azimuth line of said sound wave from the ratio of said displacements.

References Cited in the file of this patent

UNITED STATES PATENTS

| | | |
|---|---|---|
| 1,378,960 | Horton | May 24, 1921 |
| 1,406,996 | Morrill | Feb. 21, 1922 |
| 1,415,973 | Allen | May 16, 1922 |
| 1,502,243 | Fry | July 22, 1924 |
| 1,645,810 | Hubbard | Oct. 18, 1927 |
| 2,418,136 | Munson | Apr. 1, 1947 |
| 2,424,773 | Rieber | July 29, 1947 |
| 2,611,023 | Dunn | Sept. 16, 1952 |
| 2,767,917 | Fawcett | Oct. 23, 1956 |